(12) United States Patent
Tian et al.

(10) Patent No.: US 7,683,002 B2
(45) Date of Patent: Mar. 23, 2010

(54) TRANSITION METAL CATALYST AND FORMATION THEREOF

(75) Inventors: Jun Tian, League City, TX (US); William Gauthier, Hoeilaart (BE); Joseph Thorman, League City, TX (US); Shady Henry, Seabrook, TX (US)

(73) Assignee: Fina Technology, Inc., Houston, TX (US)

( * ) Notice: Subject to any disclaimer, the term of this patent is extended or adjusted under 35 U.S.C. 154(b) by 845 days.

(21) Appl. No.: 11/492,351

(22) Filed: Jul. 25, 2006

(65) Prior Publication Data

US 2007/0232484 A1 Oct. 4, 2007

Related U.S. Application Data

(60) Provisional application No. 60/788,909, filed on Apr. 4, 2006.

(51) Int. Cl.
*C08F 4/642* (2006.01)
*C08F 4/6592* (2006.01)
*B01J 31/14* (2006.01)
*B01J 31/22* (2006.01)

(52) U.S. Cl. .............. 502/104; 502/110; 502/152; 502/154

(58) Field of Classification Search ............. 502/104, 502/110, 152, 154
See application file for complete search history.

(56) References Cited

U.S. PATENT DOCUMENTS

| | | | |
|---|---|---|---|
| 4,271,060 A | 6/1981 | Hubby | |
| 4,543,399 A | 9/1985 | Jenkins et al. | |
| 4,588,790 A | 5/1986 | Jenkins et al. | |
| 5,001,205 A | 3/1991 | Hoel | |
| 5,026,798 A | 6/1991 | Canich | |
| 5,028,670 A | 7/1991 | Chinh et al. | |
| 5,236,998 A | 8/1993 | Lundeen et al. | |
| 5,317,036 A | 5/1994 | Brady et al. | |
| 5,352,749 A | 10/1994 | DeChellis et al. | |
| 5,405,922 A | 4/1995 | DeChellis et al. | |
| 5,436,304 A | 7/1995 | Griffin et al. | |
| 5,456,471 A | 10/1995 | MacDonald | |
| 5,462,999 A | 10/1995 | Griffin et al. | |
| 5,525,678 A | 6/1996 | Mink et al. | |
| 5,589,555 A | 12/1996 | Zboril et al. | |
| 5,616,661 A | 4/1997 | Eisinger et al. | |
| 5,627,242 A | 5/1997 | Jacobsen et al. | |
| 5,643,847 A | 7/1997 | Walzer | |
| 5,665,818 A | 9/1997 | Tilston et al. | |
| 5,668,228 A | 9/1997 | Chinh et al. | |
| 5,677,375 A | 10/1997 | Rifi et al. | |
| 5,703,187 A | 12/1997 | Timmers | |
| 5,747,406 A | 5/1998 | Reichle et al. | |
| 5,849,852 A | 12/1998 | Koch et al. | |
| 5,859,653 A | 1/1999 | Aoki et al. | |
| 5,869,723 A | 2/1999 | Hinokuma et al. | |
| 6,069,213 A | 5/2000 | Nemzek et al. | |
| 6,147,173 A | 11/2000 | Holtcamp | |
| 6,180,735 B1 | 1/2001 | Wenzel | |
| 6,207,606 B1 | 3/2001 | Lue et al. | |
| 6,211,105 B1 | 4/2001 | Holtcamp | |
| 6,242,545 B1 | 6/2001 | Jejelowo et al. | |
| 6,245,705 B1 | 6/2001 | Kissin | |
| 6,245,868 B1 | 6/2001 | Agapiou et al. | |
| 6,248,845 B1 | 6/2001 | Loveday et al. | |
| 6,271,323 B1 | 8/2001 | Loveday et al. | |
| 6,274,684 B1 | 8/2001 | Loveday et al. | |
| 6,300,436 B1 | 10/2001 | Agapiou et al. | |
| 6,339,134 B1 | 1/2002 | Crowther et al. | |
| 6,340,730 B1 | 1/2002 | Murray et al. | |
| 6,346,586 B1 | 2/2002 | Agapiou et al. | |
| 6,353,063 B1 * | 3/2002 | Shimizu et al. | 526/74 |
| 6,359,072 B1 | 3/2002 | Whaley | |
| 6,380,328 B1 | 4/2002 | McConville et al. | |
| 6,420,580 B1 | 7/2002 | Holtcamp | |
| 2005/0233892 A1 | 10/2005 | Tian et al. | |

FOREIGN PATENT DOCUMENTS

WO 9832775 A1 7/1998

OTHER PUBLICATIONS

Eugene You-Xian Chen and Tobin J. Marks, "Cocatalysts for Metal-Catalyzed Olefin Polymerization: Activators, Activation Processes, and Structure-Activity Relationships", 100(4) Chemical Reviews 1391-1434 (2000).

* cited by examiner

*Primary Examiner*—Caixia Lu
(74) *Attorney, Agent, or Firm*—Tenley R. Krueger

(57) ABSTRACT

Catalyst systems and methods of forming the catalyst systems are described herein. The methods generally include contacting a support material with an activator to form a support composition, contacting a component with at least a portion of an aluminum containing compound including TIBAl, wherein the component is selected from the support composition, the transition metal catalyst compound and combinations thereof and contacting the support composition with a transition metal catalyst compound to form a supported catalyst system.

13 Claims, No Drawings

TRANSITION METAL CATALYST AND FORMATION THEREOF

CROSS-REFERENCE TO RELATED APPLICATIONS

This application claims the benefit of U.S. Provisional Patent Application Ser. No. 60/788,909, filed Apr. 4, 2006.

FIELD

Embodiments of the present invention generally relate to transition metal catalyst systems.

BACKGROUND

While transition metal catalyst compounds, primarily metallocene catalysts, are capable of forming olefin monomers having desirable properties, such catalysts have generally not been utilized heavily due to lower productivity and higher costs than traditional Ziegler-Natta catalysts.

Therefore, it is desired to form a transition metal catalyst capable of experiencing increased productivity, while retaining the desirable polymer properties often achieved with such catalysts.

SUMMARY

Embodiments of the present invention include methods of forming a catalyst system. The method generally includes providing a support material, contacting the support material with a first activator to form a support composition, providing a transition metal catalyst compound, providing a aluminum containing compound including triisobutyl aluminum, contacting a component with at least a portion of the aluminum containing compound, wherein the component is selected from the support composition, the transition metal catalyst compound and combinations thereof and contacting the support composition with the transition metal catalyst compound to form a supported catalyst system.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "productivity" refers to the weight of product produced per weight of the catalyst used in a process per hour of reaction at a standard set of conditions (e.g., grams product/gram catalyst/hr).

As used herein, the term "activator" is defined to be any compound or combination of compounds, supported or unsupported, which may enhance the activity and/or productivity of a single-site catalyst compound (e.g., metallocenes, Group 15 containing catalysts, etc.)

The term "ipso carbon" refers to a carbon atom within a cyclic group having no protons attached. For example, the ipso carbon of a cyclopentadienyl group may include the carbon bonded to a bridging group.

Catalyst Systems

Embodiments of the invention generally include supported catalyst compositions/catalyst systems. The catalyst compositions generally include a support composition and a transition metal compound, which are described in greater detail below.

Such catalyst compositions generally are formed by contacting a support material with an activator to form a support composition, contacting the support composition and/or a transition metal compound with a aluminum containing compound and contacting the support composition with the transition metal compound to form a supported catalyst system; As discussed in further detail below, the catalyst systems may be formed in a number of ways and sequences.

In one or more non-limiting embodiments, the catalyst systems may be dried or maintained as a slurry upon formation and prior to polymerization therewith, for example.

The support materials may include talc, inorganic oxides, clays and clay minerals, ion-exchanged layered compounds, diatomaceous earth compounds, zeolites or a resinous support material, such as a polyolefin, for example.

Specific inorganic oxides include silica, alumina, magnesia, titania and zirconia, for example. The inorganic oxides used as support materials may have an average particle size of from 5 microns to 600 microns or from 20 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g, for example.

In one embodiment, the support material includes a silica having an average particle size of from about 5 microns to 100 microns, or from about 10 microns to 100 microns or from about 10 microns to about 30 microns, a surface area of from 50 $m^2/g$ to 1,000 $m^2/g$, or from about 80 $m^2/g$ to about 800 $m^2/g$, or from 100 $m^2/g$ to 400 $m^2/g$ or from about 150 $m^2/g$ to about 300 $m^2/g$ and a pore volume of from about 0.1 cc/g to about 5 cc/g, or from about 0.5 cc/g to about 3.5 cc/g, or from about 0.5 cc/g to about 2.0 cc/g or from about 1.0 cc/g to about 1.5 cc/g, for example. Such silica may include commercially available support materials, such as P10 silica that is commercially available from Fuji Silysia Chemical LTD, for example (e.g., silica having a surface area of 296 $m^2/g$ and a pore volume of 1.4 ml/g.)

Methods for supporting transition metal catalysts are generally known in the art. (See, U.S. Pat. No. 5,643,847, U.S. Pat. Nos. 9,184,358 and 9,184,389, which are incorporated by reference herein.)

The catalyst compositions described herein may be activated with an activator for subsequent polymerization. This may involve the abstraction of at least one leaving group (A group in the formulas/structures below, for example) from the metal center of the catalyst component. The transition metal compounds are thus activated towards olefin polymerization using such activators.

Embodiments of such activators include Lewis acids, such as cyclic or oligomeric polyhydrocarbylaluminum oxides, non-coordinating ionic activators "NCA", ionizing activators, stoichiometric activators, combinations thereof or any other compound that may enhance the activity and/or productivity of a single-site catalyst compound (e.g., metallocenes, Group 15 containing catalysts, etc.)

The Lewis acids may include alumoxane (e.g., "MAO"), modified alumoxane (e.g., "TIBAO") and alkylaluminum compounds, for example. Non-limiting examples of aluminum alkyl compounds may include trimethylaluminum, triethylaluminum, triisobutylaluminum, tri-n-hexylaluminum and tri-n-octylaluminum, for example. In one non-limiting embodiment, the alumoxane includes methylalumoxane, for example.

Ionizing activators are well known in the art and are described by, for example, *Eugene You-Xian Chen & Tobin J. Marks, Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammoniumtetrakis(pentafluorophenyl)borate and/or trisperfluorophenyl boron metalloid precursors), for example. The substituent groups may be independently selected from alkyls, alkenyls, halogen, substituted alkyls, aryls, arylhalides, alkoxy and halides, for example. In one embodiment, the three groups are independently selected from halogens, mono or multicyclic (including halosubstituted) aryls, alkyls, alkenyl compounds and mixtures thereof, for example. In another embodiment, the three groups are selected from $C_1$ to $C_{20}$ alkenyls, $C_1$ to $C_{20}$ alkyls, $C_1$ to $C_{20}$ alkoxys, $C_3$ to $C_{20}$ aryls and combinations thereof, for example. In yet another embodiment, the three groups are selected from the group highly halogenated $C_1$ to $C_4$ alkyls, highly halogenated phenyls, and highly halogenated naphthyls and mixtures thereof, for example. By "highly halogenated", it is meant that at least 50% of the hydrogens are replaced by a halogen group selected from fluorine, chlorine and bromine.

Illustrative, not limiting examples of ionic ionizing activators include trialkyl-substituted ammonium salts (e.g., triethylammoniumtetraphenylborate, tripropylammoniumtetraphenylborate, tri(n-butyl)ammoniumtetraphenylborate, trimethylammoniumtetra(p-tolyl)borate, trimethylammoniumtetra(o-tolyl)borate, tributylammoniumtetra(pentafluorophenyl)borate, tripropylammoniumtetra(o,p-dimethylphenyl)borate, tributylammoniumtetra(m,m-dimethylphenyl)borate, tributylammoniumtetra(p-tri-fluoromethylphenyl)borate, tributylammoniumtetra(pentafluorophenyl)borate and tri(n-butyl)ammoniumtetra(o-tolyl)borate), N,N-dialkylanilinium salts (e.g., N,N-dimethylaniliniumtetraphenylborate, N,N-diethylaniliniumtetraphenylborate and N,N-2,4,6-pentamethylaniliniumtetraphenylborate), dialkyl ammonium salts (e.g., diisopropylammoniumtetrapentafluorophenylborate and dicyclohexylammoniumtetraphenylborate), triaryl phosphonium salts (e.g., triphenylphosphoniumtetraphenylborate, trimethylphenylphosphoniumtetraphenylborate and tridimethylphenylphosphoniumtetraphenylborate) and their aluminum equivalents, for example.

In yet another embodiment, an alkylaluminum compound may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment, for example.

The heterocyclic compound for use as an activator with an alkylaluminum compound may be unsubstituted or substituted with one or a combination of substituent groups. Examples of suitable substituents include halogens, alkyls, alkenyls or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof, for example.

Non-limiting examples of hydrocarbon substituents include methyl, ethyl, propyl, butyl, pentyl, hexyl, cyclopentyl, cyclohexyl, benzyl, phenyl, fluoromethyl, fluoroethyl, difluoroethyl, iodopropyl, bromohexyl or chlorobenzyl, for example.

Non-limiting examples of heterocyclic compounds utilized include substituted and unsubstituted pyrroles, imidazoles, pyrazoles, pyrrolines, pyrrolidines, purines, carbazoles, indoles, phenyl indoles, 2,5,-dimethylpyrroles, 3-pentafluorophenylpyrrole, 4,5,6,7-tetrafluoroindole or 3,4-difluoropyrroles, for example.

Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and silylium salts in combination with a non-coordinating compatible anion, for example. In addition to the compounds listed above, methods of activation, such as using radiation and electro-chemical oxidation are also contemplated as activating methods for the purposes of enhancing the activity and/or productivity of a single-site catalyst compound, for example. (See, U.S. Pat. No. 5,849,852, U.S. Pat. No. 5,859,653, U.S. Pat. No. 5,869,723 and WO 98/32775.)

The catalyst may be activated in any manner known to one skilled in the art. For example, the catalyst and activator may be combined in weight ratios of activator to catalyst component of from 1000:1 to 0.1:1, or from 500:1 to 0.5:1, or from about 100:1 to about 250:1, or from 150:1 to 0.5:1, or from 50:1 to 0.5:1, or from 10:1 to 0.5:1 or from 3:1 to 0.3:1, for example.

The support composition and/or the transition metal compound are further contacted with an aluminum containing compound, such as an organic aluminum compound. In one or more embodiments, the aluminum containing compound includes triisobutyl aluminum (TIBAl).

In one embodiment, at least a portion (e.g., a first portion) of the aluminum containing compound contacts the support composition. Another portion (e.g., a second portion) of the aluminum containing compound may contact the transition metal compound. In one or more embodiments, the first portion and the second portion are the same aluminum containing compound. However, it is contemplated that in one or more embodiments, the first portion and the second portion are different aluminum containing compounds, for example.

In one or more embodiments, the first portion and the second portion are equal amounts. For example, about 50 wt. % of the aluminum containing compound may contact the support composition and about 50 wt. % of the aluminum containing compound may contact the transition metal compound prior to contact with one another. In another embodiment, from about 20 wt. % to about 80 wt. %, or from about 30 wt. % to about 70 wt. % or from about 50 wt. % to about 70 wt. % of the aluminum containing compound may contact the support composition and from about 80 wt. % to about 20 wt. %, or from about 30 wt. % to about 60 wt. % or from about 35 wt. % to about 55 wt. % of the aluminum containing compound may contact the transition metal compound prior to contact with one another, for example. In one embodiment, the weight ratio of the support composition to the aluminum containing compound (e.g., Si:Al$^{(2)}$) may be from about 0.01:1 to about 10:1, for example.

Alternatively, the transition metal compound and the support composition may be contacted in the presence of the aluminum containing compound. In another embodiment, the transition metal compound, the support composition or combinations thereof may be contacted with the aluminum containing compound. For example, the support composition may be contacted with the aluminum containing compound.

The contact may occur by contacting the support composition with the aluminum containing compound at a reaction temperature of from about 0° C. to about 150° C. or from about 20° C. to about 100° C. for a time of from about 10 minutes to about 5 hours or from about 30 minutes to about 120 minutes, for example.

Such contact may occur in the presence of an inert solvent. Although the process is discussed below in terms of charging the transition metal compound in an inert solvent, the support composition (either in combination with the transition metal compound or alternatively) may be mixed with the inert solvent to form a support slurry prior to contact with the transition metal compound. Methods for supporting transition metal catalysts are generally known in the art. (See, U.S. Pat. No. 5,643,847, U.S. Pat. Nos. 9,184,358 and 9,184,389, which are incorporated by reference herein.)

A variety of non-polar hydrocarbons may be used as the inert solvent, but any non-polar hydrocarbon selected should remain in liquid form at all relevant reaction temperatures and the ingredients used to form the supported catalyst composition should be at least partially soluble in the non-polar hydrocarbon. Accordingly, the non-polar hydrocarbon is considered to be a solvent herein, even though in certain embodiments the ingredients are only partially soluble in the hydrocarbon.

Suitable hydrocarbons include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof. In one specific embodiment, the inert solvent includes isohexane. In another embodiment, the inert solvent includes mineral oil including an amount of toluene.

Optionally, the support material, the catalyst component, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TMA), triisobutyl aluminum (TIBAl), methylalumoxane (MAO), isobutyl aluminoxane and tri-n-octyl aluminum. In one specific embodiment, the scavenging compound is TIBAl.

In one embodiment, the amount of scavenging compound is minimized during polymerization to that amount effective to enhance activity and avoided altogether if the feeds and polymerization medium may be sufficiently free of impurities.

As referred to herein, the transition metal compound includes single site transition metal compounds, such as a metallocene catalyst compounds. Metallocene catalysts may be characterized generally as coordination compounds incorporating one or more cyclopentadienyl (Cp) groups (which may be substituted or unsubstituted, each substitution being the same or different) coordinated with a transition metal through π bonding.

The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

A specific, non-limiting, example of a metallocene catalyst is a bulky ligand metallocene compound generally represented by the formula:

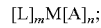

wherein L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst." The Cp ligands are distinct from the leaving groups bound to the catalyst compound in that they are not highly susceptible to substitution/abstraction reactions.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl or "H$_4$Ind"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbomoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one embodiment, two or more leaving groups form a part of a fused ring or ring system.

In a specific embodiment, L and A may be bridged to one another to form a bridged metallocene catalyst. A bridged metallocene catalyst, for example, may be described by the general formula:

$$XCp^4Cp^BMA_n;$$

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof; wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $-Si(R)_2Si(R_2)-$, $R_2Ge=$ or $RP=$ (wherein "=" represents two chemical bonds), where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 4 to 10 ring members or 5 to 7 ring members, for example. The ring members may be selected from the elements mentioned above and/or from one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

$$X(CpR^1_nR^2_m)(FlR^3_p);$$

wherein Cp is a cyclopentadienyl group or derivatives thereof, Fl is a fluorenyl group, X is a structural bridge between Cp and Fl, $R^1$ is a substituent on the Cp, n is 1 or 2, $R^2$ is a substituent on the Cp bound to a carbon immediately adjacent to the ipso carbon, m is 1 or 2, each $R^3$ is the same or different and is a hydrocarbyl group having from 1 to 20 carbon atoms with at least one $R^3$ being substituted in the para position on the fluorenyl group and at least one other $R^3$ being substituted at an opposed para position on the fluorenyl group and p is 2 or 4.

In yet another aspect, the metallocene catalyst includes bridged mono-ligand metallocene compounds (e.g., mono cyclopentadienyl catalyst components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.)

Non-limiting examples of metallocene catalyst components consistent with the description herein include, for example:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$, (2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
ethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$,
cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecyclcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$, bistriethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$, bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethyleyclopentadienylcyclobutylamidotitanium$A_n$,
dimethylsilyltetramethyleyclopentadienylcyclopentylamidotitanium$A_n$,
dimethylsilyltetramethylcyclopentadienylcyclohexylamidotitatium$A_n$, dimethylsilyltetramethylcyclopentadienylcycloheptylamidotitaniumA$_n$,
dimethylsilyltetramethylcyclopentadienylcyclooctylamidotitaniumA$_n$,
dimethylsilyltetramethylcyclopentadienylcyclononylamidotitaniumA$_n$,
dimethylsilyltetramethylcyclopentadienylcyclodecylamidotitaniumA$_n$,
dimethylsilyltetramethylcyclopentadienylcycloundecylamidotitaniumA$_n$,
dimethylsilyltetramethylcyclopentadienylcyclododecylamidotitaniumA$_n$,
dimethylsilyltetramethylcyclopentadienyl(sec-butylamido)titanium$_n$,
dimethylsilyl(tetramethylcyclopentadienyl)(n-octylamido)titaniumA$_n$,
dimethylsilyl(tetramethylcyclopentadienyl)(n-decylamido)titaniumA$_n$,
dimethylsilyl(tetramethylcyclopentadienyl)(n-octadecylamido)titaniumA$_n$,
methylphenylsilyltetramethylcyclopentadienylcyclopropylamidotitaniumA$_n$,
methylphenylsilyltetramethylcyclopentadienylcyclobutylamidotitaniumA$_n$,
methylphenylsilyltetramethylcyclopentadienylcyclopentylamidotitaniumA$_n$,
methylphenylsilyltetramethylcyclopentadienylcyclohexylamidotitaniumA$_n$,
methylphenylsilyltetramethylcyclopentadienylcycloheptylamidotitaniumA$_n$,
methylphenylsilyltetramethylcyclopentadienylcyclooctylamidotitaniumA$_n$,
methylphenylsilyltetramethylcyclopentadienylcyclononylamidotitaniumA$_n$,
methylphenylsilyltetramethylcyclopentadienylcyclodecylamidotitaniumA$_n$,
methylphenylsilyltetramethylcyclopentadienylcycloundecylamidotitaniumA$_n$,
methylphenylsilyltetramethylcyclopentadienylcyclododecylamidotitaniumA$_n$,
methylphenylsilyl(tetramethylcyclopentadienyl)(sec-butylamido)titatiumA$_n$,
methylphenylsilyl(tetramethylcyclopentadienyl)(n-octylamido)titaniumA$_n$,
methylphenylsilyl(tetramethylcyclopentadienyl)(n-decylamido)titaniumA$_n$,
methylphenylsilyl(tetramethylcyclopentadienyl)(n-octadecylamido)titaniumA$_n$,
diphenylsilyltetramethylcyclopentadienylcyclopropylamidotitaniumA$_n$,
diphenylsilyltetramethylcyclopentadienylcyclobutylamidotitaniumA$_n$,
diphenylsilyltetramethylcyclopentadienylcyclopentylamidotitaniumA$_n$,
diphenylsilyltetramethylcyclopentadienylcyclohexylamidotitaniumA$_n$,
diphenylsilyltetramethylcyclopentadienylcycloheptylamidotitaniumA$_n$,
diphenylsilyltetramethylcyclopentadienylcyclooctylamidotitaniumA$_n$,
diphenylsilyltetramethylcyclopentadienylcyclononylamidotitatiumA$_n$,
diphenylsilyltetramethylcyclopentadienylcyclodecylamidotitaniumA$_n$,
diphenylsilyltetramethylcyclopentadienylcycloundecylamidotitaniumA$_n$,
diphenylsilyltetramethylcyclopentadienylcyclododecylamidotitaniumA$_n$,
diphenylsilyl(tetramethylcyclopentadienyl)(sec-butylamido)titaniumA$_n$,
diphenylsilyl(tetramethylcyclopentadienyl)(n-octylamido)titaniumA$_n$,
diphenylsilyl(tetramethylcyclopentadienyl)(n-decylamido)titaniumA$_n$,
diphenylsilyl(tetramethylcyclopentadienyl)(n-octadecylamido)titaniumA$_n$.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678, U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173, which are incorporated by reference herein.)

In certain embodiments, the processes described above generally include polymerizing olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661, U.S. Pat. No. 5,627,242, U.S. Pat. No. 5,665,818, U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Optionally, the polymerization process may include the addition of hydrogen to the process for control of the polymer molecular weight, for example. Such addition is known to one skilled in the art and depends upon specific reaction conditions. However, hydrogen concentrations may be from about 0.3 mol % to about 1.1 mol % or from about 0.5 mol % to about 0.8 mol % based on monomer, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example. In one embodiment, the polymers include isotactic polypropylene.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

EXAMPLES

In the following examples, samples of metallocene catalyst compounds were prepared. The metallocene used herein is dimethylsilylbis(2-methyl-4-phenyl-indenyl)zirconium dichloride.

As used below "P10" refers to silica that is commercially available from Fuji Silysia Chemical LTD having a surface area of 296 $m^2$/g and a pore volume of 1.4 ml/g.

Support A: The preparation of Support A (absent TIBAl) was achieved by drying P10 silica at 150° C. under nitrogen for about 12 hours. The dried silica was stored at room temperature under nitrogen and then 20 g of the silica was introduced to a 500 mL round-bottom flask equipped with a stir bar. The preparation then included adding 250 mL of dry toluene to the flask and stirring the resulting suspension at room temperature for about 3 minutes. The preparation then included dropwise addition of MAO in toluene (30 wt. %) to the flask at room temperature to result in an MAO/Si weight ratio of 0.7:1.0. The resulting mixture was then stirred for 30 minutes at room temperature and then heated to 115° C. for 4 hours. The slurry was then filtered through a glass frit. The resulting solid was washed with 20 g. of dry toluene and three times with 20 g. of iso-hexane. The resulting support was then dried under vacuum at room temperature for another 3 hours.

Support B: The preparation of Support B (TIBAl) was achieved by drying P10 silica at 150° C. under nitrogen for about 12 hours. The dried silica was stored at room temperature under nitrogen and then 20 g of the silica was introduced to a 500 mL round-bottom flask equipped with a stir bar. The preparation then included adding 250 mL of dry toluene to the flask and stirring the resulting suspension at room temperature for about 3 minutes. The preparation then included dropwise addition of MAO in toluene (30 wt. %) to the flask at room temperature to result in an MAO/$SiO_2$ weight ratio of 0.7:1.0. The preparation then included adding TIBAl (30 wt. % in isohexane) to the suspension in a weight ratio of TIBAl to the silica of 0.5:1. The resulting support was then filtered and washed three times with isohexane.

Catalyst A: The preparation of Catalyst A (no TIBAl) was achieved by introducing 5 g. of Support A into a 100 mL flask. The preparation then included adding 50 g. of dry toluene to the flask under nitrogen and stirring the resulting suspension at room temperature. The metallocene (1.0 wt. % in 10 g. of toluene) was then added to the suspension and stirred for 2 hours at ambient temperature under nitrogen. The resulting slurry was then filtered through a glass frit filter and washed 3 times with 15 g. of dry toluene and 2 times with 15 g. of dry hexane. The resulting dark red solid is then dried under vacuum at room temperature for one hour.

Catalyst B: The preparation further included mixing TIBAl (30 wt. % in isohexane) with 5 g. of the metallocene (2.0 wt. % in 10 g. of toluene) in amount equal to the amount of TIBAl added to the support in the support preparation and then adding the mixture to Support B and stirring the resulting mixture for 2 hours at ambient temperature under nitrogen. The resulting slurry was then filtered through a glass frit filter and washed 2 times with hexane. The resulting brownish yellow solid is then dried under vacuum at room temperature for one hour.

The resulting catalysts were then contacted with propylene monomer to form polyproypylene. (170 g of propylene, 10 mg. TEAl scavenger in 0.5 L autoclave zipper reactor at 67° C. for 1 hour.) The results of such polymerizations follow in Table 1.

TABLE 1

| Catalyst | Productivity | Amount | BD | Mn | Mw | Mz |
|---|---|---|---|---|---|---|
| A | 8.37 | 5 | 0.418 | | | |
| A | 8.05 | 7.5 | 0.403 | 13735 | 90529 | 242347 |
| A | 11.87 | 10 | 0.417 | 38178 | 200199 | 652233 |
| B | 16.42 | 5 | 0.431 | 18794 | 69378 | 149975 |
| B | 16.60 | 7.5 | 0.413 | 24855 | 84184 | 167702 |
| B | 23.27 | 10 | 0.432 | 56638 | 211691 | 561941 |

*productivity is expressed in kg PP/gCat/hour, Amount is the catalyst amount in mg, BD is the polymer bulk density in g/mL, Mn is the number average molecular weight, Mw is the weight average molecular weight and Mz is the z average molecular weight Unexpectedly, it has been discovered that productivity is enhanced with the TIBAl treatment while retaining essentially the same polymer properties. For example, a doubling in the productivity was observed in the examples. However, it is contemplated that any increase in productivity may be observed in commercial production. For example, the embodiments of the invention may include at least about a 10% increase, at least about a 20% increase, at least about a 30%, or a 40%, or a 50%, or a 60%, or a 70%, or an 80% or at least a 90% increase in productivity. Further, while a somewhat larger particle size was observed, the resulting polymers were effective polymers for traditional miPP applications. It has further been observed that such polymerizations unexpectedly proceed with a minimal amount of reactor fouling (i.e., fouling was undetectable).

While the foregoing is directed to embodiments of the present invention, other and further embodiments of the invention may be devised without departing from the basic scope thereof and the scope thereof is determined by the claims that follow.

What is claimed is:

1. A method of forming a catalyst system comprising:
    providing a support material;
    contacting the support material with an activator to form a support composition;
    providing a single site transition metal catalyst compound;
    providing a aluminum containing compound, wherein the aluminum containing compound comprises triisobutyl aluminum; and
    contacting the support composition with the transition metal catalyst compound to form a supported catalyst system, wherein the support composition is contacted with a first portion of the aluminum containing compound and the transition metal catalyst compound is contacted with a second portion of the aluminum containing compound prior to contact of the support composition with the transition metal catalyst compound.

2. The method of claim 1, wherein the support material comprises silica.

3. The method of claim 1, wherein the activator comprises an organic aluminum compound.

4. The method of claim 3, wherein the organic aluminum compound comprises methyl alumoxane.

5. The method of claim 1, wherein the support composition comprises an activator to support material weight ratio of from about 0.05:1 to about 2:1.

6. The method of claim 1, wherein the transition metal catalyst compound comprises a metallocene catalyst.

7. The method of claim 1, wherein the supported catalyst system comprises from about 0.05 wt. % to about 2 wt. % transition metal catalyst compound.

8. The method of claim 1, wherein the first portion and the second portion are substantially equal.

9. The method of claim 1, wherein the aluminum containing compound comprises from about 45 wt. % to about 80 wt. % first portion and from about 55 wt. % to about 20 wt. % second portion.

10. The method of claim 1, wherein the first portion contacts the support composition in a weight ratio of from about 0.5:1 to about 2:1.

11. The method of claim 1, wherein the second portion contacts the transition metal catalyst compound in a weight ratio of from about 15:1 to about 30:1.

12. The method of claim 1, wherein the support composition is contacted with the transition metal catalyst component in the presence of an inert solvent.

13. The method of claim 12, wherein the inert solvent comprises isohexane.

* * * * *